H. KELLER.
TOOL FOR PNEUMATIC HAMMERS.
APPLICATION FILED AUG. 5, 1912.

1,088,154.

Patented Feb. 24, 1914.

Witnesses:
C. E. Wessels.
B. J. Richards

Inventor:
Henry Keller,
By Joshua R. H. Potts
his Attorney.

UNITED STATES PATENT OFFICE.

HENRY KELLER, OF CHICAGO, ILLINOIS.

TOOL FOR PNEUMATIC HAMMERS.

1,088,154.  Specification of Letters Patent.  Patented Feb. 24, 1914.

Application filed August 5, 1912. Serial No. 713,501.

*To all whom it may concern:*

Be it known that I, HENRY KELLER, a citizen of the United States, and a resident of the city of Chicago, county of Cook, and State of Illinois, have invented certain new and useful Improvements in Tools for Pneumatic Hammers, of which the following is a specification.

My invention relates to improvements in tools for pneumatic hammers and the like and has for its object the provision of an improved tool of this character which is durable and efficient in use.

The invention consists in the combinations and arrangements of parts hereinafter described and claimed.

Figure 1:
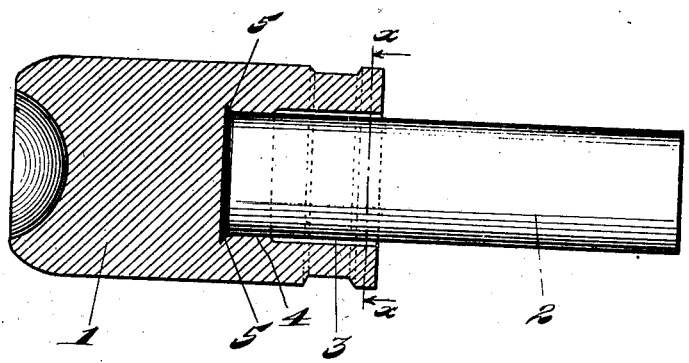
Figure 2:
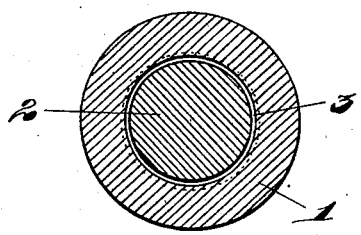

The invention will be best understood by reference to the accompanying drawings forming a part of this specification, and in which, Figure 1 is a longitudinal section of a tool embodying my invention, and Fig. 2 is a section of said tool taken on line $x$—$x$ of Fig. 1.

The preferred form of construction as illustrated in the drawings comprises a tool head 1 recessed at one end for the reception of a tool shank 2. The recess in head 1 is made cylindrical in form and is provided with an outer larger portion 3, an inner constricted portion 4 and a locking enlargement 5 located just beyond the constricted portion 4. The tool shank 2 is made cylindrical in form to fit tightly the constricted portion 4 of the recess and pass loosely through the enlarged portion 3 thereof. By this arrangement, when the blows of the hammer are applied to the shank of the tool in the usual manner, the inner end of the shank spreads to fill enlargement 5 and thus securely locks the shank in the head. By this arrangement it will be observed that the inner end of the shank will be locked securely in the head whereas the adjacent portion of the shank will have a slight looseness or freedom of movement therein, and I have found by experience that this arrangement tends to prevent the snapping off of the tool shank where it hits the tool head and thus prolongs the life of the tool. The tool head illustrated in the drawing is an ordinary rivet, but it is obvious that any other form of tool head may be secured to the shank in the same manner.

While I have illustrated and described the preferred form of construction for carrying my invention into effect, this is capable of variation and modification without departing from the spirit of the invention. I, therefore, do not wish to be limited to the exact details as set forth but desire to avail myself of such variations and modifications as come within the scope of the appended claims.

Having described my invention, what I claim as new and desire to secure by Letters Patent is:

1. A tool of the class described comprising a tool head having a recess therein; and a tool shank passing loosely into said recess and rigidly secured at its inner end to said head, substantially as described.

2. A tool of the class described comprising a tool head having a recess therein, said recess being constricted at its inner portion; and a tool shank passing loosely through the outer portion of said recess and tightly fitting the inner portion, substantially as described.

3. A tool of the class described comprising a tool head having a recess therein, said recess being constricted at its inner portion and having a locking enlargement beyond said constricted portion; and a tool shank passing loosely through the outer portion of said recess and tightly fitting the inner portion, the inner end of said shank being spread to fit said enlargement, substantially as described.

In testimony whereof I have signed my name to this specification in the presence of two subscribing witnesses.

HENRY KELLER.

Witnesses:
 ARTHUR A. OLSON,
 JOSHUA R. H. POTTS.